United States Patent
Puri et al.

(10) Patent No.: US 12,532,482 B2
(45) Date of Patent: Jan. 20, 2026

(54) MEMORY CELL ARRAY STRUCTURE HAVING BIT LINE FOR REDUCING SIGNAL RESISTANCE, MEMORY DEVICE INCLUDING THE SAME, AND METHOD OF FORMING THE SAME

(71) Applicant: GLOBALFOUNDRIES U.S. Inc., Malta, NY (US)

(72) Inventors: Sandeep Puri, Ballston Lake, NY (US); Venkatesh Periyapatna Gopinath, Fremont, CA (US); Bipul C. Paul, Mechanicville, NY (US)

(73) Assignee: GLOBALFOUNDRIES U.S. Inc., Malta, NY (US)

( * ) Notice: Subject to any disclaimer, the term of this patent is extended or adjusted under 35 U.S.C. 154(b) by 659 days.

(21) Appl. No.: 18/064,786

(22) Filed: Dec. 12, 2022

(65) Prior Publication Data
US 2024/0196629 A1  Jun. 13, 2024

(51) Int. Cl.
*H10B 63/00* (2023.01)
*H10N 70/00* (2023.01)

(52) U.S. Cl.
CPC ............. *H10B 63/80* (2023.02); *H10B 63/30* (2023.02); *H10N 70/011* (2023.02)

(58) Field of Classification Search
CPC ....... H10B 63/80; H10B 63/30; H10N 70/011
See application file for complete search history.

(56) References Cited

U.S. PATENT DOCUMENTS

| | | |
|---|---|---|
| 9,147,836 B2 | 9/2015 | Greene et al. |
| 9,461,245 B1 | 10/2016 | Yang et al. |
| 9,647,037 B2 | 5/2017 | Lu et al. |
| 2014/0175365 A1 | 6/2014 | Chang et al. |
| 2024/0196629 A1* | 6/2024 | Puri ............... H10N 70/8833 |

OTHER PUBLICATIONS

O. Golonzka et al., "Non-Volatile RRAM Embedded into 22fFL FinFET Technology," Intel Corporation, Symposium on VLSI Technology Digest of Technical Papers, 2019.

* cited by examiner

*Primary Examiner* — Mark V Prenty

(57) ABSTRACT

A memory cell array structure includes a memory cell including a memory element and a transistor having a source terminal coupled to a second electrode of the memory element, a bit line coupled to a drain terminal of the transistor and including first and second metal lines extending in a first direction, the second metal line coupled to the first metal line and disposed over the first metal line in a third direction, a word line coupled to a gate terminal of the transistor and including a third metal line that extends in a second direction and is disposed over the second metal line in the third direction, and a source line coupled to a first electrode of the memory element. The first to the third directions are perpendicular to each other. The first and the second metal lines together carry a signal through the bit line.

19 Claims, 10 Drawing Sheets

MEMORY CELL ARRAY STRUCTURE HAVING BIT LINE FOR REDUCING SIGNAL RESISTANCE, MEMORY DEVICE INCLUDING THE SAME, AND METHOD OF FORMING THE SAME

FIELD OF THE DISCLOSURE

The present disclosure relates to a cell array structure of a memory device for reducing signal resistance of a bit line.

BACKGROUND

Memory devices are trending toward high-integration and high-capacity. Therefore, in such a memory device, each bit line is connected to a large number of cells and a bit line signal is transmitted through the bit line to write or read data in or from the cells. Among the cells connected to the bit line, cells furthest from peripheral circuits have a higher bit error rate (BER) compared to cells closest to the peripheral circuits. This indicates signal resistance of the bit line is playing a major role in degrading the BER by increasing drooping of the bit line and reducing a current flowing through the bit line as the bit line becomes longer.

SUMMARY

Embodiments of the present disclosure relate to a memory cell array structure, a memory device including the memory cell array structure, and a method of forming the cell array structure, capable of reducing signal resistance of a bit line and improving a BER by forming the bit line to transfer a bit line signal through two stacked metal lines.

In an embodiment, a memory cell array structure may include a memory cell including a memory element and a transistor having a source terminal coupled to a second electrode of the memory element, a bit line coupled to a drain terminal of the transistor, the bit line including a first metal line and a second metal line extending in a first direction, the second metal line coupled to the first metal line and disposed over the first metal line in a third direction, a word line coupled to a gate terminal of the transistor, the word line including a third metal line that extends in a second direction crossing the first direction and is disposed over the second metal line in the third direction, the first and the second directions being perpendicular to the third direction, and a source line coupled to a first electrode of the memory element, wherein the first metal line and the second metal line together carry a bit line signal through the bit line.

In another embodiment, a memory device may include a plurality of memory cells arranged in a first direction, each of the memory cells including a memory element and a transistor having a source terminal coupled to a second electrode of the memory element, a bit line coupled to drain terminals of the transistors of the memory cells, the bit line including a first metal line and a second metal line extending in the first direction, the second metal line coupled to the first metal line and disposed over the first metal line in a third direction, a plurality of word lines respectively coupled to gate terminals of the transistors of the memory cells, each of the word lines including a third metal line that extends in a second direction crossing the first direction and is disposed over the second metal line in the third direction, the first and the second directions being perpendicular to the third direction, and a source line coupled to first electrodes of the memory elements of the memory cells, wherein the first metal line and the second metal line together carry a bit line signal through the bit line.

In another embodiment, a method of forming a memory cell array structure may include forming a memory cell including a memory element and a transistor having a source terminal coupled to a second electrode of the memory element, forming a bit line coupled to a drain terminal of the transistor, the bit line being formed of a first metal line and a second metal line extending in a first direction, the second metal line coupled to the first metal line and formed over the first metal line in a third direction, forming a word line coupled to a gate terminal of the transistor, the word line being formed of a third metal line that extends in a second direction crossing the first direction and is formed over the second metal line in the third direction, the first and the second directions being perpendicular to the third direction, and forming a source line coupled to a first electrode of the memory element, wherein the first metal line and the second metal line together carry a bit line signal through the bit line.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
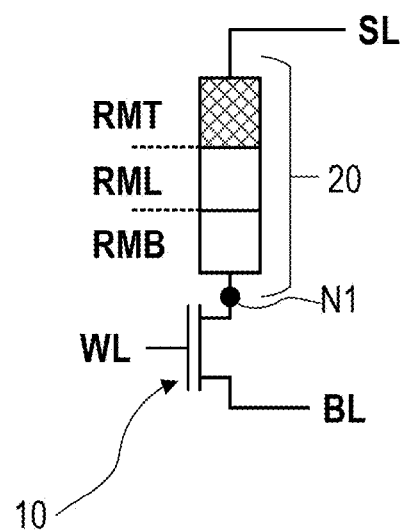
FIG. 1 illustrates a bitcell of a memory device according to an embodiment of the present disclosure.

Exemplary embodiments of the present disclosure will be described below in more detail with reference to the accompanying drawings. The inventive features may, however, be embodied in different forms and should not be construed as limited to the embodiments set forth herein. Rather, these embodiments are provided so that this disclosure will be thorough and complete, and will fully convey the scope of the present claims to those skilled in the art. Throughout the disclosure, like reference numerals refer to like parts throughout the various figures and embodiments.

It will be understood that, although the terms "first" and/or "second" may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

The drawings are not necessarily to scale and in some instances, proportions may have been exaggerated in order to clearly illustrate features of the embodiments. When a first element is referred to as being "on" a second element or "on" a substrate, it not only refers to a case where the first element is formed directly on the second element or the substrate but also a case where a third element exists between the first element and the second element or the substrate.

An element "connected" or "coupled" to or with another element may be directly connected or coupled to or with the other element or, instead, one or more intervening elements may be present. A element "contact" another element may be directly on or in direct contact with the other element or, instead, one or more intervening elements may be present.

FIG. 1 illustrates a bitcell BC of a memory device according to an embodiment of the present disclosure. The memory device may be a non-volatile memory device such as a resistive random access memory (ReRAM or RRAM) device, a phase-change memory device, or the like.

The bitcell BC may include an access transistor 10 and a memory element 20. The memory element 20 may be connected to the access transistor 10 through a connection node N1.

The access transistor 10 may be implemented with a n-type field-effect-transistor (NFET). The memory element 20 may include an anode (or first or top electrode) RMT, a cathode (or second or bottom electrode) RMB, and a storage material layer RML disposed between the anode RMT and the cathode RMB. When the memory device is an ReRAM device, the storage material layer may be a resistive material layer. Therefore, in this description, the storage material layer RML may be referred to as a 'resistive material layer.'

The bitcell BC may store one-bit data or multiple-bit data. For example, when the bitcell BC stores one-bit data, the resistive material layer RML may be in a low resistance state, e.g., 0, or a high resistance state, e.g., 1, corresponding to data stored in the memory element 20, in particular, in the resistive material layer RML.

The access transistor 10 may include a source terminal, a gate terminal, and a drain terminal. In this embodiment, the drain terminal is connected to a bit line BL, the gate terminal is connected to a word line WL, and the source terminal is connected to the cathode RMB of the memory element 20. The anode RMT of the memory element 20 is connected to a common source line SL. However, embodiments are not limited to this configuration. In another embodiment, the drain terminal of the access transistor 10 is connected to the common source line SL, and the anode RMT of the memory element 20 is connected to the bit line BL.

In a write operation, data is written in the bitcell BC by turning on the access transistor 10 and applying a high voltage between the bit line BL and the common source line SL. A high current flows through the resistive material layer RML and thus one or more filaments providing conductive paths bridging the anode RMT and the cathode RMB may be formed or destroyed in the resistive material layer RML, so that the resistance state of the resistive material layer RML is changed. By changing the resistance state of the resistive material layer RML, the data is written in the bitcell BC.

In a read operation, the data stored in the bitcell BC is read out by turning on the access transistor 10 and sensing the resistance state of the resistive material layer RML.

Figure 2:
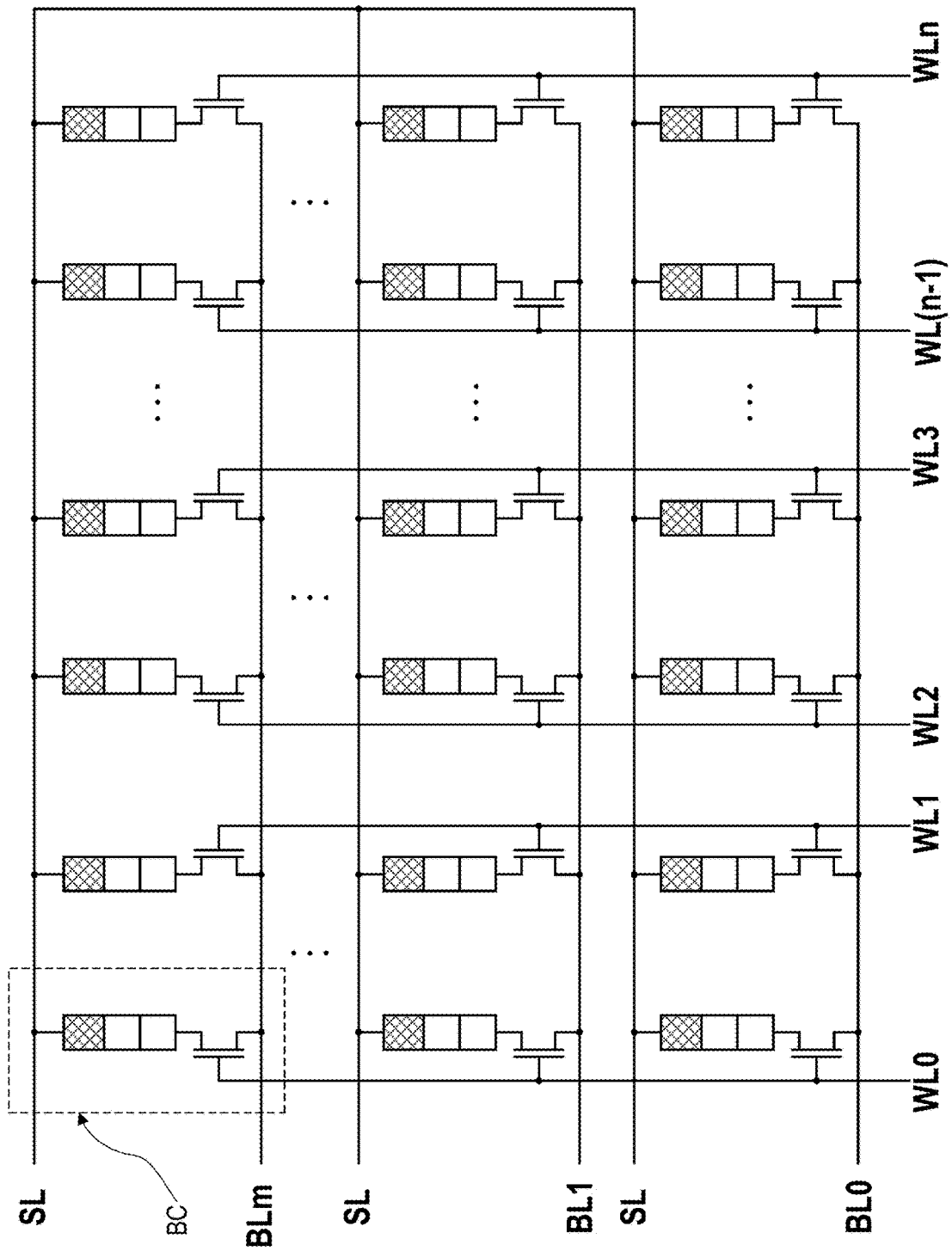
FIG. 2 illustrates a memory cell array structure according to an embodiment of the present disclosure.

FIG. 2 illustrates a memory cell array structure according to an embodiment of the present disclosure.

Referring to FIG. 2, the memory cell array structure may include a plurality of bitcells BC, a plurality of bit lines BL0 to BLm, a plurality of word lines WL0 to WLn, and a common source line SL, each of m and n being a positive integer.

The plurality of bitcells BC may be arranged in the form of a matrix in a row direction and a column direction with respect to the orientation of FIG. 2. For example, each of the plurality of bitcells BC is connected to a corresponding one of the plurality of bit lines BL0 to BLm, a corresponding one of the plurality of word lines WL0 to WLn, and the common source line SL. Each of the plurality of bitcells BC may include an access transistor and a memory element as described above with reference to FIG. 1.

Each of the plurality of bit lines BL0 to BLm may be commonly connected to a set of bitcells BC, arranged in a first direction (or row direction), among the plurality of bitcells BC. In an embodiment, the bit line BL is connected to drain terminals of the access transistors included in the set of bitcells BC arranged in the first direction.

Each of the plurality of word lines WL0 to WLn may be commonly connected to a set of bitcells BC, arranged in a second direction (or column direction), among the plurality of bitcells BC, the second direction crossing the first direction. In an embodiment, the word line WL is connected to gate terminals of the access transistors included in the set of bitcells BC arranged in the second direction.

The common source line SL may be connected to all of the plurality of bitcells BC. In an embodiment, the common source line SL is connected to anodes of memory elements included in the plurality of bitcells BC.

As the degree of integration and storage capacity of a memory device are increased, a larger number of bitcells are connected to one bit line and thus a length of the bit line is increasing. As a result, when a signal is transferred through the bit line, a current flowing through the bit line may be reduced and thus resistance of the bit line signal transferring through the bit line, i.e., signal resistance, may be significantly increased. This may deteriorate a BER of the memory device.

In order to improve the BER of the memory device due to the increased signal resistance of the bit line, the present disclosure provides a bit line made of two metal lines through which the bit line signal is transferred. That is, the current for a single bit line signal flows through the two metal lines at the same time.

Embodiments of the present disclosure will be described in detail with reference to FIGS. 3 to 8.

Figure 3:
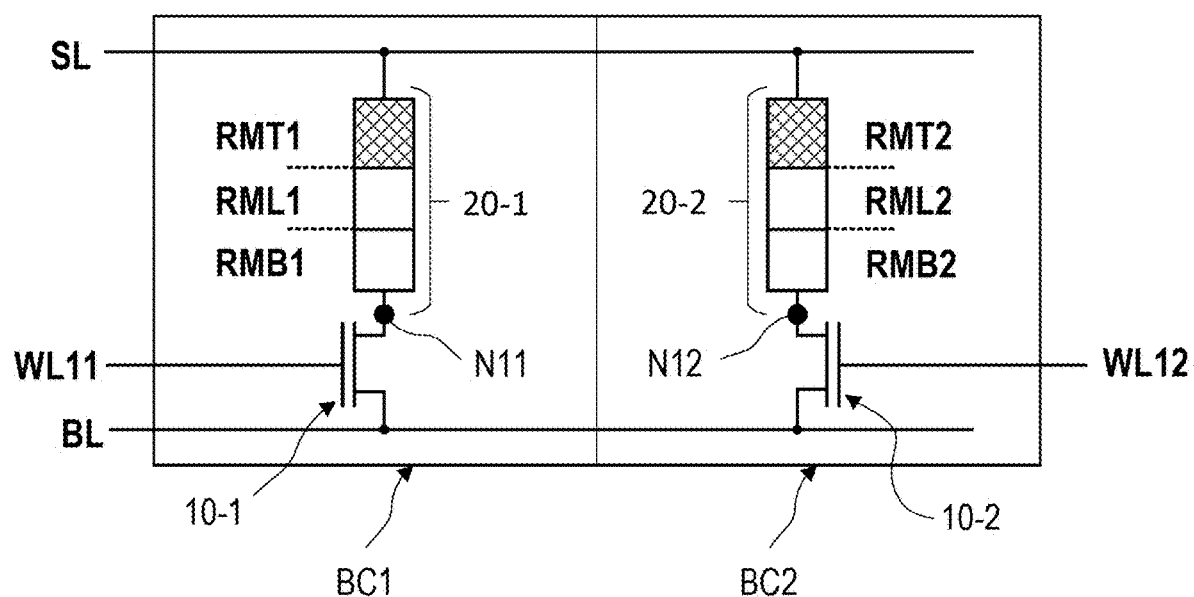
FIG. 3 illustrates two bitcells according to an embodiment of the present disclosure.

FIG. 3 illustrates two bitcells according to an embodiment of the present disclosure.

Referring to FIG. 3, a first bitcell BC1 and a second bitcell BC2 share one diffusion region (not shown), and are disposed and coupled between one bit line BL and a common source line SL, but they are connected to two different word lines WL11 and WL12, respectively. Each of the two bitcells BC1 and BC2 has the same configuration as the bitcell described above with reference to FIG. 1.

The first bitcell BC1 includes an access transistor 10-1 and a memory element 20-1 that are connected through a first connection node N11. The memory element 20-1 includes a stack structure of a cathode RMB1, a resistive material layer RML1, and an anode RMT1. A source terminal of the access transistor 10-1 and the cathode RMB1 are connected to each other through the first connection node N11. A gate terminal of the access transistor 10-1 is connected to the word line WL11.

The second bitcell BC2 includes an access transistor 10-2 and a memory element 20-2 that are connected through a second connection node N12. The memory element 20-2 includes a stack structure of a cathode RMB2, a resistive material layer RML2, and an anode RMT2. A source terminal of the access transistor 10-2 and the cathode RMB2 are connected to each other through the second connection node N12. A gate terminal of the access transistor 10-2 is connected to the word line WL12.

Drain terminals of the access transistor 10-1 and the access transistor 10-2 are commonly connected to the bit line BL. The anodes RMT1 and RMT2 are commonly connected to the common source line SL.

FIGS. 4A to 7A are plan views illustrating a method of forming a memory cell array structure according to an embodiment of the present disclosure. FIGS. 4B to 7B and 8 are cross-sectional views schematically illustrating the method of forming the memory cell array structure according to the embodiment of the present disclosure. In this embodiment, the memory cell array structure may include two bitcells corresponding to the first and the second bitcells BC1 and BC2 shown in FIG. 3.

The cross-sectional views each show the memory cell array structure including the first and the second bitcells BC1 and BC2 taken along line A-A' of each of the plan views. Since each of the cross-sectional views conceptionally illustrate the memory cell array structure, a size and a shape of each component of the memory cell array structure may not be exactly the same as those illustrated in a corresponding plan view.

The method of forming the memory cell array structure illustrated in FIGS. 4A to 7A will be described with reference to the first and the second bitcells BC1 and BC2 shown in FIG. 3.

Figure 4A:
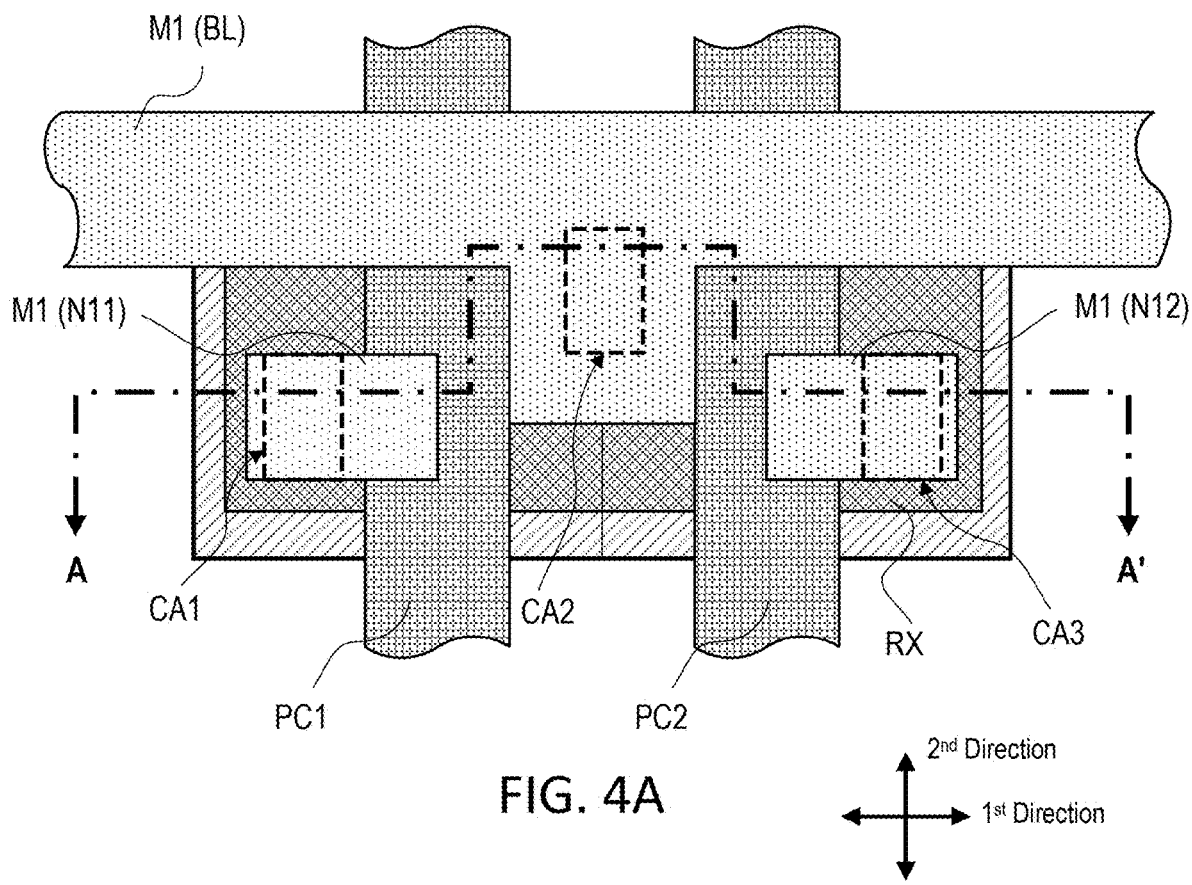
FIGS. 4A, 5A, 6A, and 7A are plan views illustrating a method of forming a memory cell array structure according to an embodiment of the present disclosure.
Figure 4B:
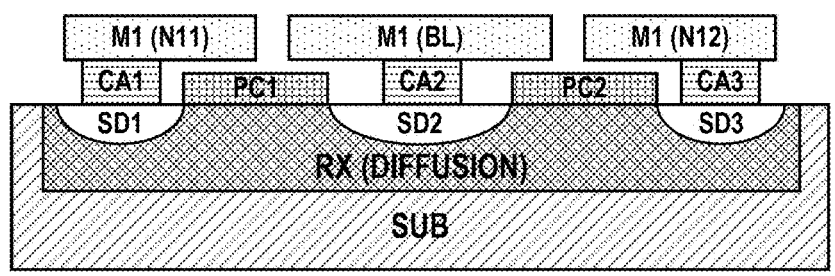
FIGS. 4B, 5B, 6B, 7B, and 8 are cross-sectional views illustrating the method of forming the memory cell array structure according to the embodiment of the present disclosure.

Referring to FIGS. 4A and 4B, a substrate SUB is provided, and then a diffusion region RX is formed in the substrate SUB. After that, the access transistors 10-1 and 10-2 of the two bitcells BC1 and BC2 are formed by forming first and second gate lines PC1 and PC2 on the diffusion region RX and then forming, in the diffusion region RX, source/drain regions SD1 to SD3 of the access transistors 10-1 and 10-2.

The first and the second gate lines PC1 and PC2 are spaced apart from each other in a first direction and extend in a second direction to be parallel to each other. The first direction crosses the second direction, and the first and the second directions are parallel to a top surface of the substrate SUB. The first and the second gate lines PC1 and PC2 correspond to the gate terminals of the access transistors 10-1 and 10-2, respectively.

The source/drain regions SD1 to SD3 of the access transistors 10-1 and 10-2 are formed at both sides of each of the first and the second gate lines PC1 and PC2 so that the access transistors 10-1 and 10-2 share the source/drain region SD2 that is disposed between the first and the second gate lines PC1 and PC2.

After that, a plurality of contacts, e.g., CA1, CA2, and CA3, are formed on the source/drain regions SD1, SD2, and SD3, respectively, in a third direction perpendicular to the first and the second direction. The third direction is a stack direction. The contact CA1 formed on the source/drain region SD1 corresponds to the source terminal of the access transistor 10-1, the contact CA2 formed on the source/drain region SD2 corresponds to the common drain terminals of the access transistors 10-1 and 10-2, and the contact CA3 formed on the source/drain region SD3 corresponds to the source terminal of the access transistor 10-2.

After forming the plurality of contacts CA1, CA2, and CA3, a first metal layer is formed by depositing a first metal M1 on a resultant structure including the plurality of contacts CA1, CA2, and CA3 and the first and the second gate lines PC1 and PC2. The first metal layer is patterned to form first-metal node patterns M1(N11) and M1(N12) and a first-metal bit line M1(BL).

The first-metal node pattern M1(N11) may be formed to be in contact with a top surface of the contact CA1, and the first-metal node pattern M1(N12) may formed to be in contact with a top surface of the contact CA3.

The first-metal bit line M1(BL) may extend in the first direction and have a first portion and a second portion. The first portion is a line portion extending in the first direction. The second portion is a portion protruding in the second direction so that the first-metal bit line M1(BL) is fully in contact with a top surface of the contact CA2. Therefore, the first-metal bit line M1(BL) is connected to the common drain terminals of the access transistors 10-1 and 10-2 through the contact CA2.

Figure 5A:
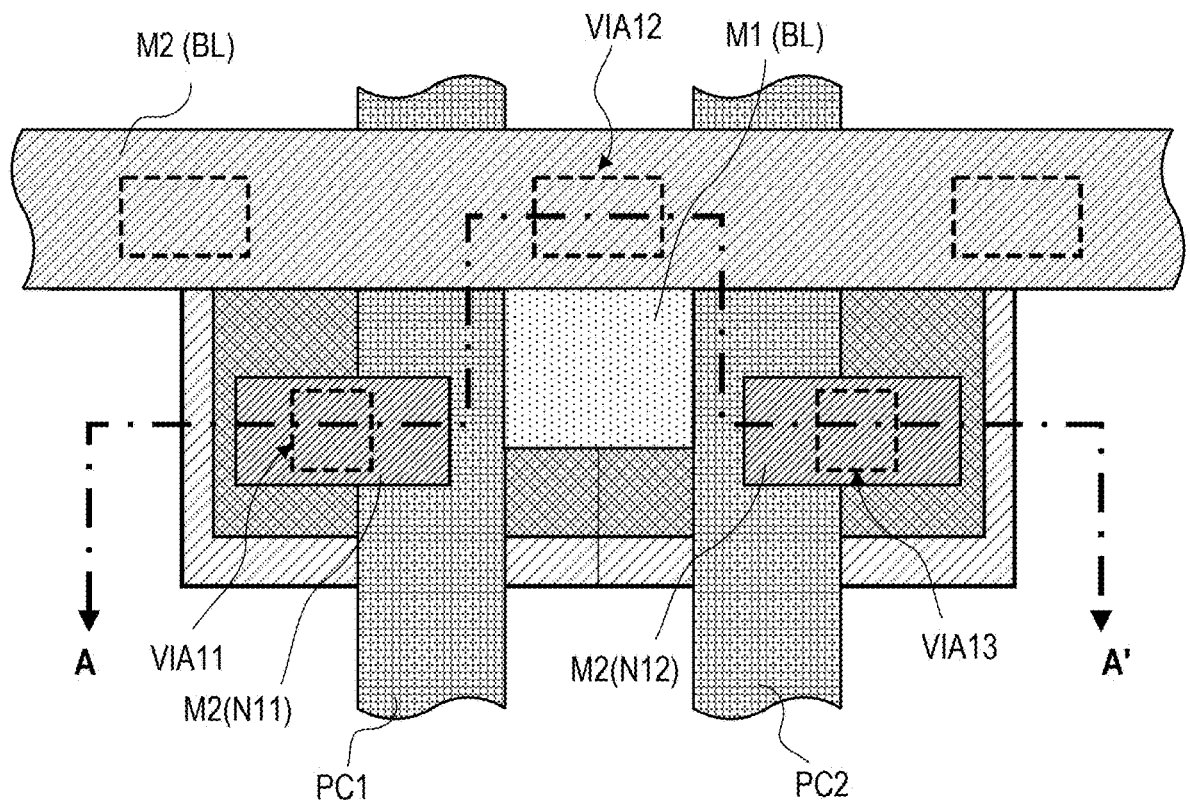
Figure 5B:
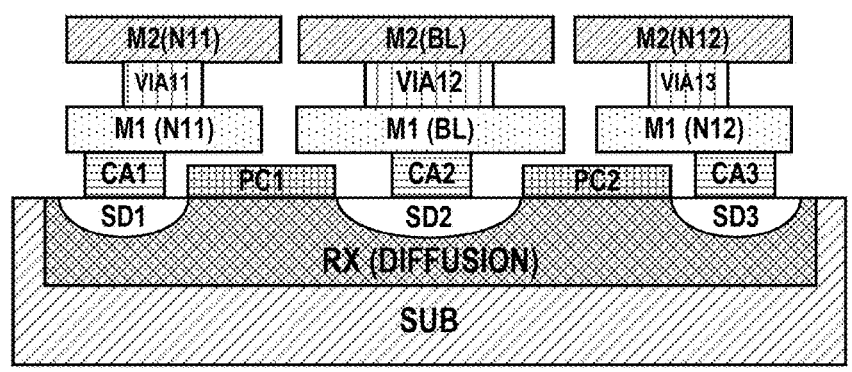

Referring to FIGS. 5A and 5B, a plurality of first via contacts, e.g., VIA11, VIA12, and VIA13, are formed on the first-metal node pattern M1(N11), the first-metal bit line M1(BL), and the first-metal node pattern M1(N12), respectively. After that, a second metal layer is formed by depositing a second metal M2 on a resultant structure including the plurality of first via contacts VIA11, VIA12, and VIA13. The second metal layer is patterned to form second-metal node patterns M2(N11) and M2(N12) and a second-metal bit line M2(BL).

The conductivity of the second-metal bit line M2(BL) may be equal to or higher than the conductivity of the first-metal bit line M1(BL). In embodiments, the second metal layer may use a metal material with a higher conductivity than a metal material used for the first metal layer and/or a structure of the second-metal bit line M2(BL) may have a greater width and/or thickness than a structure of the first-metal bit line M1(BL).

The second-metal bit line M2(BL) may extend in the first direction so that the second-metal bit line M2(BL) is formed on the first-metal bit line M1(BL) and in contact with a top surface of the first via contact VIA12. A plurality of first via contacts VIA12 may be formed along the first-metal bit line M1(BL) and the second-metal bit line M2(BL) between the first-metal bit line M1(BL) and the second-metal bit line M2(BL). Therefore, the second-metal bit line M2(BL) is connected to the first-metal bit line M1(BL) through the plurality of first via contacts VIA12. The first-metal bit line M1(BL) and the second-metal bit line M2(BL) may be disposed in the same region when viewed in a plan view to be aligned with each other in the third direction.

The first-metal bit line M1(BL) and the second-metal bit line M2(BL) together correspond to the bit line BL commonly connected to the drain terminals of the access transistors 10-1 and 10-2 of the two bitcells BC1 and BC2. Accordingly, in the embodiment illustrated in FIG. 5A, both of the first-metal bit line M1(BL) and the second-metal bit line M2(BL) provide a bit line current in parallel to the each of bitcells, reducing the total resistance compared to a device in which a bit line current is provided to the bitcells using only a single bit line formed of one metal layer.

The second-metal node pattern M2(N11) may be formed to be in contact with a top surface of the first via contact VIA11, and the second-metal node pattern M2(N12) may formed to be in contact with a top surface of the first via contact VIA13.

The second-metal node patterns M2(N11) and M2(N12) may have a higher conductivity than the first-metal node patterns M1(N11) and M1(N12). A structure of second-metal node patterns M2(N11) and M2(N12) may have a greater width and/or thickness than a structure of the first-metal node patterns M1(N11) and M1(N12). In an embodiment, the second-metal node pattern M2(N11) may have a greater width than the first-metal node pattern M1(N11) in a longitudinal direction, e.g., the first direction, than the second direction, and the second-metal node pattern M2(N12) may have a greater width than the first-metal node pattern M1(N12) in a longitudinal direction, e.g., the first direction, than the second direction.

Figure 6A:
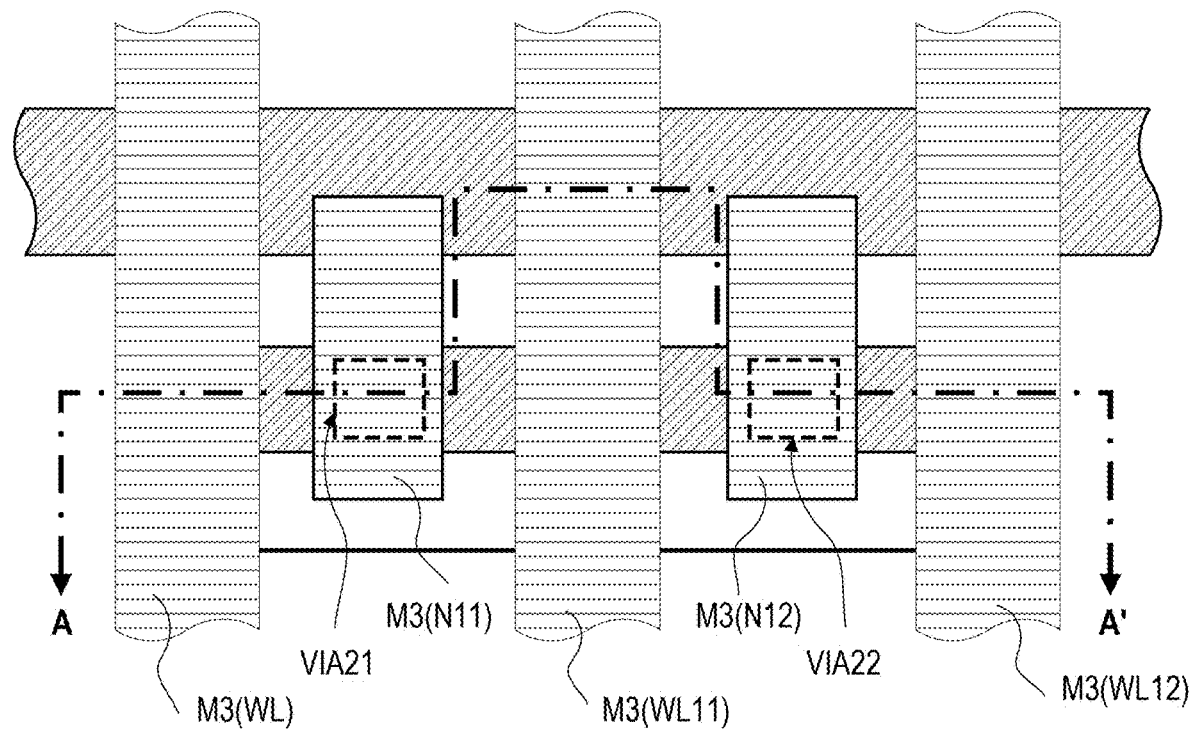
Figure 6B:
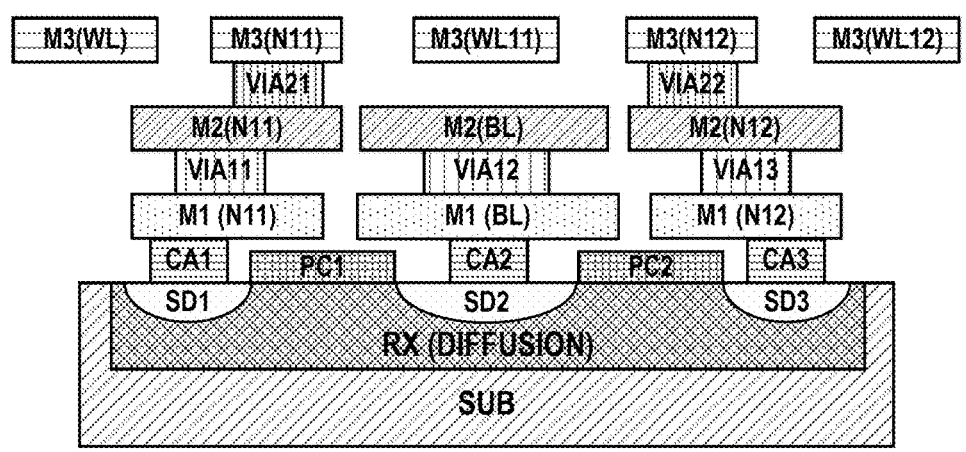

Referring to FIGS. 6A and 6B, a plurality of second via contacts, e.g., VIA21 and VIA22, are formed on the second-metal node patterns M2(N11) and M2(N12), respectively. After that, a third metal layer is formed by depositing a third metal M3 on a resultant structure including the plurality of second via contacts VIA21 and VIA22. The third metal layer is patterned to form third-metal node patterns M3(N11) and M3(N12) and a plurality of word lines, e.g., M3(WL), M3(WL11), and M3(WL12).

Each of the plurality of word lines M3(WL), M3(WL11), and M3(WL12) extend in the second direction. The word line M3(WL11) corresponds to the word line WL11 connected to the gate terminal of the access transistor 10-1, and the word line M3(WL12) corresponds to the word line WL12 connected to the gate terminal of the access transistor 10-2.

The third-metal node patterns M3(N11) and M3(N12) are disposed between the word line M3(WL) and the word line M3(WL11) and between the word line M3(WL11) and the word line M3(WL12), respectively. Therefore, the third-metal node patterns M3(N11) and M3(N12) and the plurality of word lines M3(WL), M3(WL11), and M3(WL12) are alternately arranged in the first direction to be parallel to each other.

A longitudinal direction of the third-metal node patterns M3(N11) and M3(N12) corresponds to the second direction. The third-metal node patterns M3(N11) and M3(N12) are in contact with top surfaces of the second via contacts VIA21 and VIA22, respectively. In an embodiment, the third-metal node patterns M3(N11) and M3(N12) may have a higher conductivity than the second-metal node patterns M2(N11) and M2(N12). A structure of third-metal node patterns M3(N11) and M3(N12) may have a greater width and/or thickness than a structure of the second-metal node patterns M2(N11) and M2(N12).

In an embodiment, the first-metal node pattern M1(N11), the first via contact VIA11, the second-metal node pattern M2(N11), the second via contact VIA21, and the third-metal node pattern M3(N11) together may correspond to the first connection node N11 in the first bitcell BC1. The first-metal node pattern M1(N12), the first via contact VIA13, the second-metal node pattern M2(N12), the second via contact VIA22, and the third-metal node pattern M3(N12) together may correspond to the second connection node N12 in the second bitcell BC2. That is, the first connection node N11 corresponds to a stack structure of M1(N11)/VIA11/M2(N11)/VIA21/M3(N11). The second connection node N12 corresponds to a stack structure of M1(N12)/VIA13/M2(N12)/VIA22/M3(N13).

In an embodiment, the third-metal node patterns M3(N11) and M3(N12) may be used as landing pads of the cathodes RMB1 and RMB2 of the memory elements 20-1 and 20-2, respectively. Therefore, the plurality of word lines M3(WL), M3(WL11), and M3(WL12) are disposed at the same stack level as the third-metal node patterns M3(N11) and M3(N12), which are the landing pads of the cathodes RMB1 and RMB2.

Figure 7A:
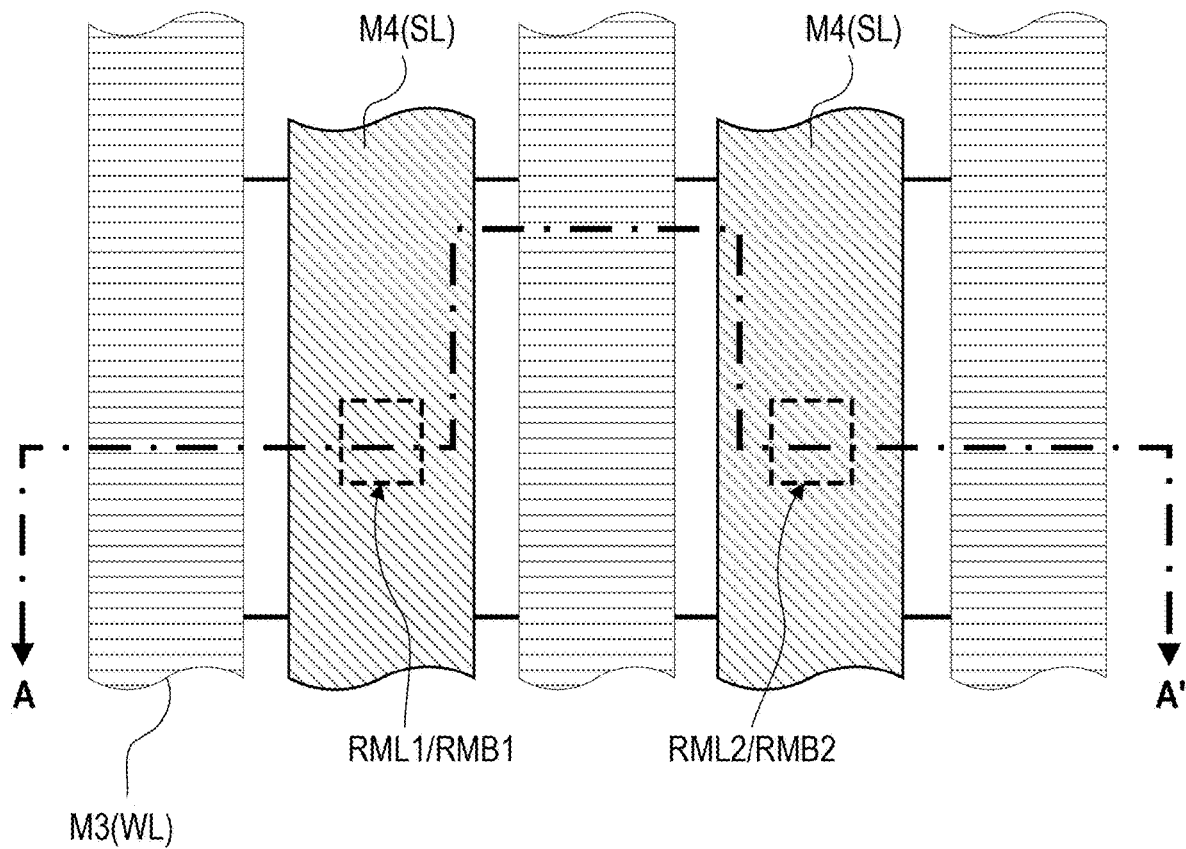
Figure 7B:
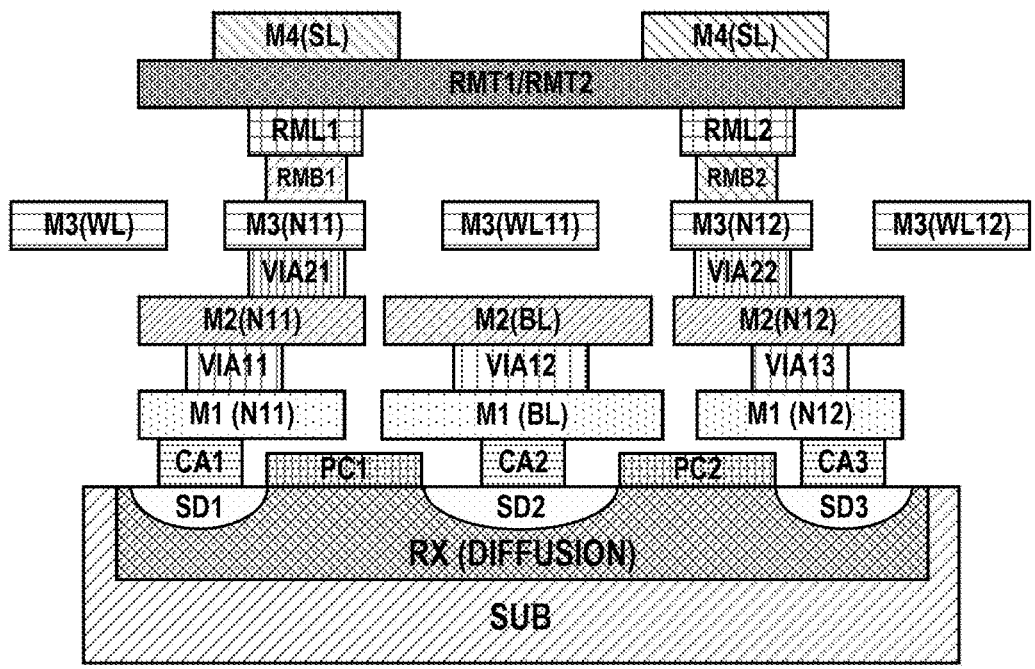

Referring to FIGS. 7A and 7B, cathode patterns RMB1 and RMB2 are respectively formed on the third-metal node patterns M3(N11) and M3(N12). The cathode patterns RMB1 and RMB2 may be formed of a conductive material.

Resistive material patterns RML1 and RML2 are respectively formed on the cathode patterns RMB1 and RMB2.

Anode patterns RMT1 and RMT2 are formed by sharing a common conductive plate on the resistive material patterns RML1 and RML2.

In an embodiment, each of the cathode patterns RMB1 and RMB2 and each of the resistive material patterns RML1 and RML2 may have an island shape. The anode patterns RMT1 and RMT2 may have a plate shape. Therefore, portions of the common conductive plate, which respectively correspond to the resistive material patterns RML1 and RML2, may be considered as the anode patterns RMT1 and RMT2, respectively. Anodes of all of the bitcells in the memory cell array structure illustrated in FIG. 2 are connected to each other since the anode patterns are formed using the common conductive plate.

The cathode patterns RMB1 and RMB2 correspond to the cathodes RMB1 and RMB2 of the memory elements 20-1 and 20-2, respectively. The resistive material patterns RML1 and RML2 correspond to the resistive material layers RML1 and RML2 of the memory elements 20-1 and 20-2, respectively. The anode patterns RMT1 and RMT2 correspond to the anodes RMT1 and RMT2 of the memory elements 20-1 and 20-2, respectively.

Next, fourth metal lines M4(SL) are formed on the anode patterns RMT1 and RMT2 by depositing a fourth metal M4 on the common conductive plate RMT1/RMT2 and patterning the deposited fourth metal M4. The fourth metal lines M4(SL) are respectively disposed over the memory elements 20-1 and 20-2, respectively. The fourth metal lines M4(SL) extend in the second direction.

In another embodiment, the third-metal node patterns M3(N11) and M3(N12) may correspond to the cathodes RMB1 and RMB2 of the memory elements 20-1 and 20-2, respectively. In this case, the process of forming the cathode patterns RMB1 and RMB2 may be omitted. Therefore, the cathodes RMB1 and RMB2 may be at the same stack level as the plurality of word lines M3(WL), M3(WL11), and M3(WL12).

In another embodiment, the fourth metal lines M4(SL) may correspond to the anodes RMT1 and RMT2 of the memory elements 20-1 and 20-2, respectively. In this case, the process of forming the anode patterns RMT1 and RMT2 may be omitted.

Figure 8:
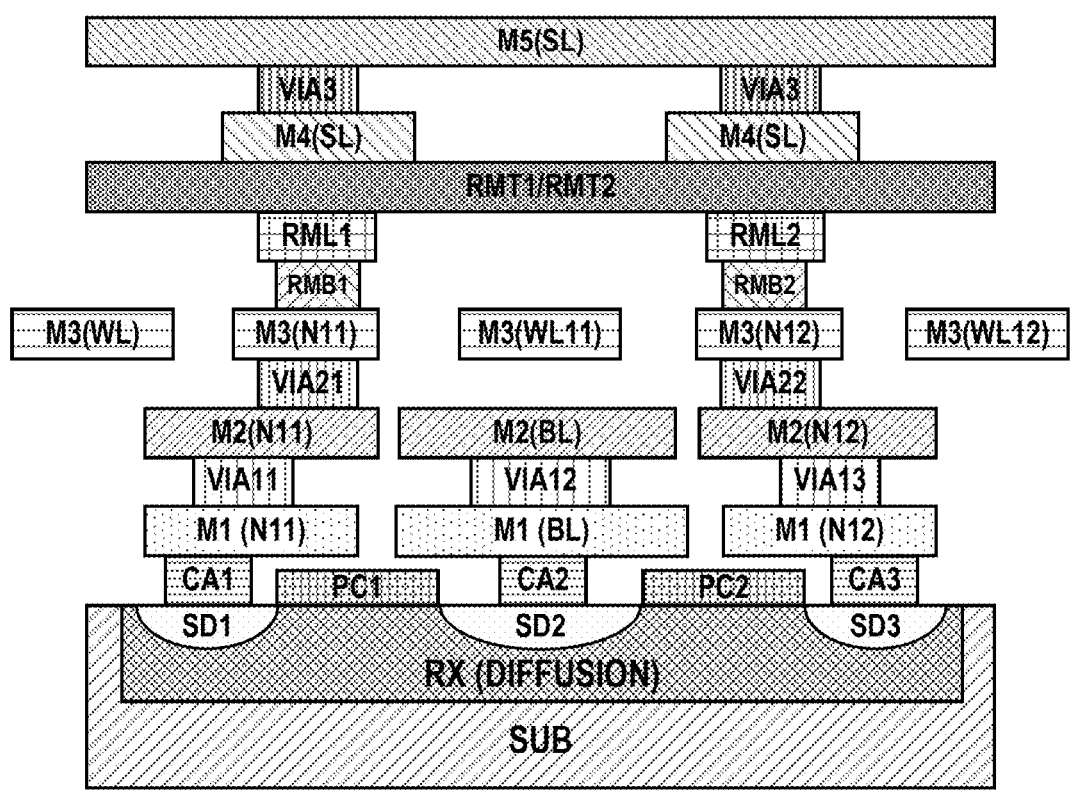

Referring to FIG. 8, a plurality of third via contacts VIA3 are formed along the fourth metal lines M4(SL) on the fourth metal lines M4(SL). After that, a fifth metal plate M5(SL) is formed on the plurality of third via contacts VIA3 by depositing a fifth metal M5, so that the fifth metal plate M5(SL) is connected to the fourth metal lines M4(SL) through the plurality of third via contacts VIA3.

In an embodiment, the fourth metal lines M4(SL) and the fifth metal plate M5(SL) together may correspond to the common source line SL commonly connected to the anodes of all of the bitcells in the cell array structure illustrated in FIG. 2.

The two bitcells BC1 and BC2 shown in FIG. 3 are formed according to the manufacturing processes described above with reference to FIGS. 4A-7A, 4B-7B, and 8. For illustrative convenience, other processes, which are required to form the above structures illustrated in FIGS. 4A-7A, 4B-7B, and 8, but are well known and obvious to a person of ordinary skill in the art, are omitted.

In an embodiment, gate lines, e.g., the first and the second gate lines PC1 and PC2, may be connected to word lines, e.g., the word lines M3(WL11) and M3(WL12), in a word line termination region. This will be described with reference to FIGS. 9A and 9B.

Figure 9A:
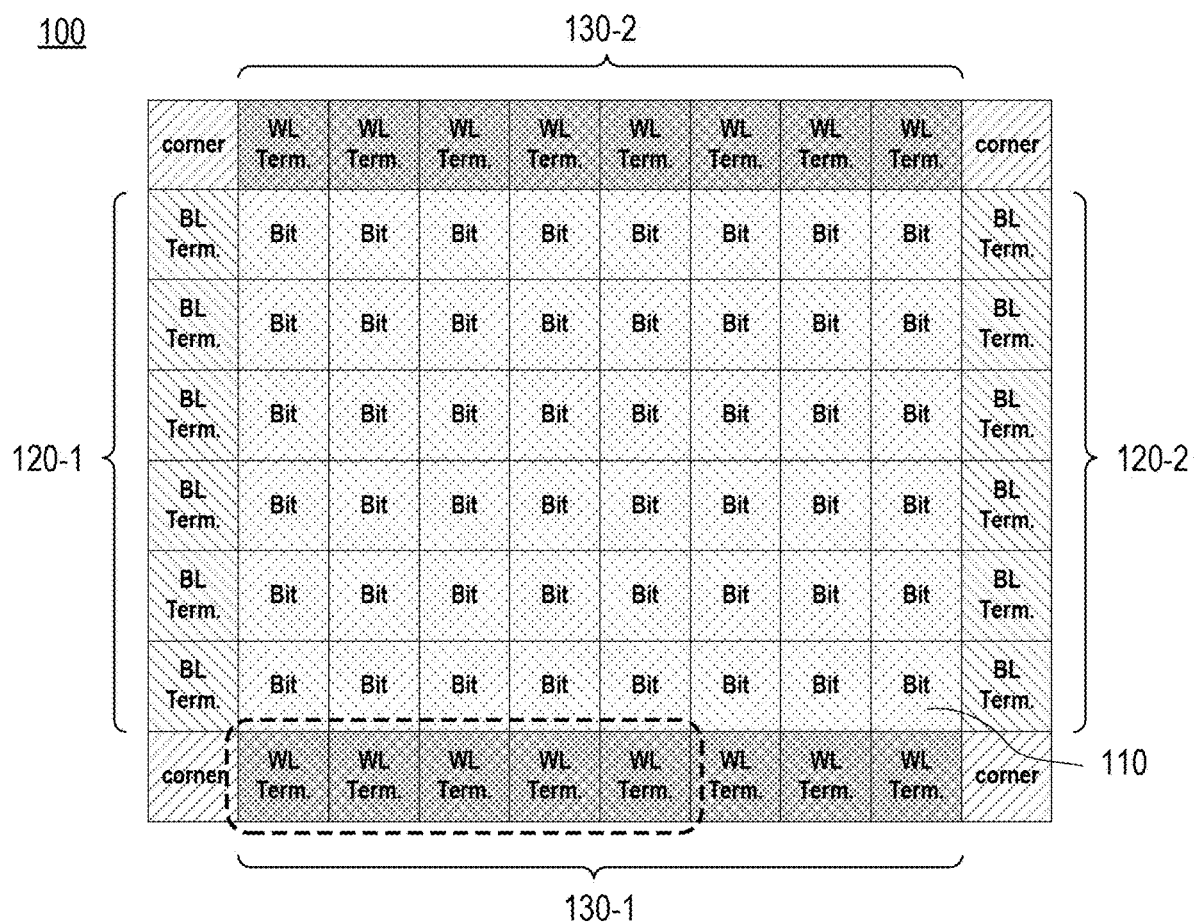
FIGS. 9A and 9B illustrate a word line termination structure according to an embodiment of the present disclosure.
Figure 9B:
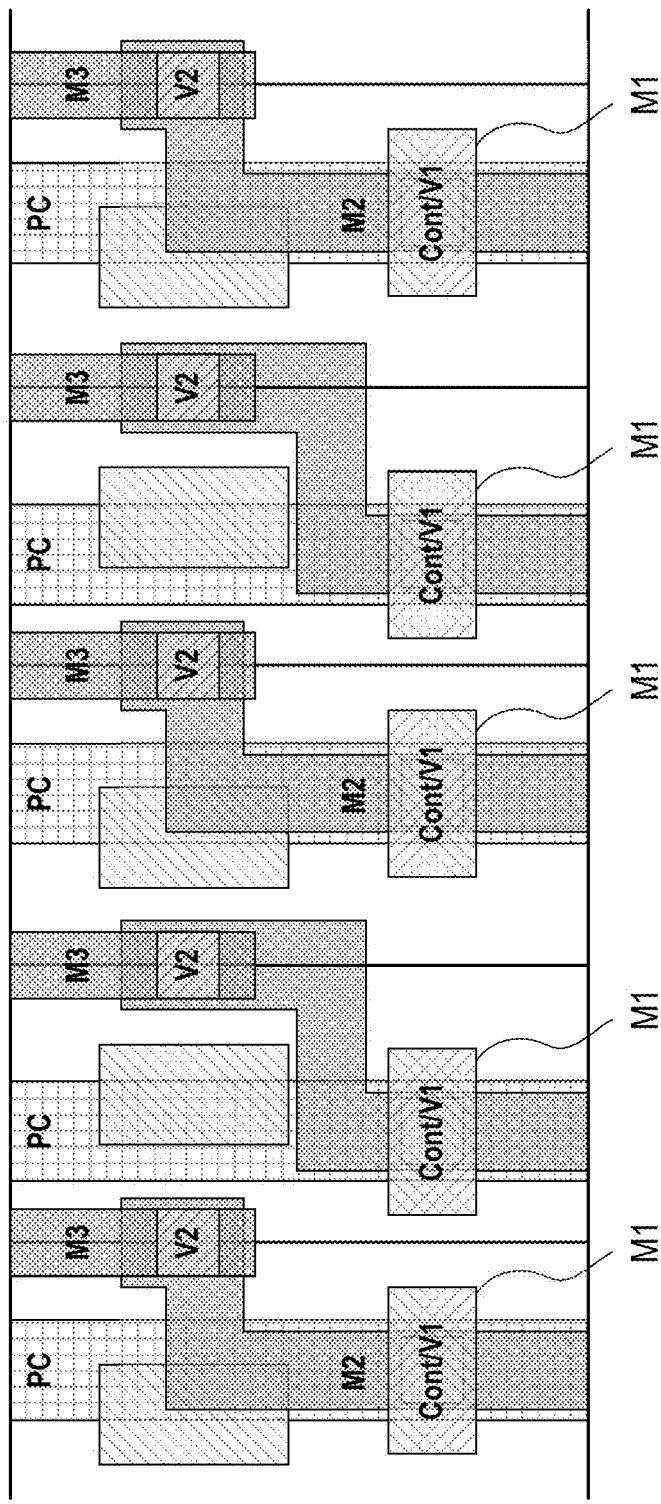

FIG. 9A illustrates a memory cell array 100 according to an embodiment of the present disclosure, and FIG. 9B illustrates a word line termination structure according to an embodiment of the present disclosure.

Referring to FIG. 9A, the memory cell array 100 may include a bitcell array region 110, bit line termination regions 120-1 and 120-2, and word line termination regions 130-1 and 130-2. The bit line termination regions 120-1 and 120-2 may be disposed at both sides of the bitcell array region 110 in a first direction. The word line termination regions 130-1 and 130-2 may be disposed at both sides of the bitcell array region 110 in a second direction that is perpendicular to the first direction.

In an embodiment, the word line termination structure may be disposed in each of the word line termination regions 130-1 and 130-2. The word line termination structure includes a plurality of word line termination cells (WL Term.), each of which is formed to connect a gate line and a corresponding word line.

In an embodiment, each of the bit line termination regions 120-1 and 120-2 may include a plurality of bit line termination cells (BL Term.). The bitcell array region 110 includes a plurality of bitcells (Bit).

FIG. 9B illustrates a word line termination structure corresponding to five word line termination cells in a dotted region in FIG. 9A. Referring to FIG. 9B, for each gate line PC, the gate line PC is connected to a word line M3 through a contact (Cont), a first metal pattern M1, a first via contact V1, a second metal pattern M2, and a second via contact V2 at both ends of the gate line PC in the word line termination regions 130-1 and 130-2. That is, a word line termination cell has a stack structure of the contact (Cont), the first metal pattern M1, the first via contact V1, the second metal pattern M2, and the second via contact V2, and thus its configuration is different from a configuration of a bitcell described above with reference to FIGS. 3 to 8.

As described above, according to embodiments of the present disclosure, a bit line is formed of two metal lines including a first metal line and a second metal line that are stacked over a substrate. A word line is formed of a third metal line disposed on the second metal line, and is at the same stack level as a cathode of a memory element of a bitcell.

Therefore, it is possible to reduce signal resistance of the bit line when a bit line signal is transferred through the bit line formed of the two metal lines. According to the embodiments of the present disclosure, the signal resistance of the bit line may be reduced by about 50% to 60%, so that a BER of a memory device can be improved without increasing an area occupied by the bit line.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

The invention claimed is:

1. A memory cell array structure, comprising:
   a memory cell including a memory element and a transistor having a source terminal coupled to a second electrode of the memory element;
   a bit line coupled to a drain terminal of the transistor, the bit line including a first metal line and a second metal line extending in a first direction, the second metal line coupled to the first metal line and disposed over the first metal line in a third direction;
   a word line coupled to a gate terminal of the transistor, the word line including a third metal line that extends in a second direction crossing the first direction and is disposed over the second metal line in the third direction, the first and the second directions being perpendicular to the third direction; and
   a source line coupled to a first electrode of the memory element,
   wherein the first metal line and the second metal line together carry a bit line signal through the bit line.

2. The memory cell array structure of claim 1, wherein the memory cell array structure includes a first metal level, a second metal level over the first metal level, a third metal level over the second metal level, and a fourth metal level over the third metal level,
   the source line is disposed on the fourth metal level, and the memory element is disposed between the third metal level and the fourth metal level.

3. The memory cell array structure of claim 2, wherein the word line and the second electrode of the memory element are on the third metal level.

4. The memory cell array structure of claim 1, wherein the second metal line has higher conductivity than the first metal line.

5. The memory cell array structure of claim 1, wherein the memory element includes a resistive material layer between the first electrode and the second electrode.

6. The memory cell array structure of claim 1, wherein the first electrode has a plate shape and the second electrode has an island shape, when viewed in a plan view.

7. A memory device, comprising:
   a plurality of memory cells arranged in a first direction, each of the memory cells including a memory element and a transistor having a source terminal coupled to a second electrode of the memory element;
   a bit line coupled to drain terminals of the transistors of the memory cells, the bit line including a first metal line and a second metal line extending in the first direction, the second metal line coupled to the first metal line and disposed over the first metal line in a third direction;
   a plurality of word lines respectively coupled to gate terminals of the transistors of the memory cells, each of the word lines including a third metal line that extends in a second direction crossing the first direction and is disposed over the second metal line in the third direction, the first and the second directions being perpendicular to the third direction; and
   a source line coupled to first electrodes of the memory elements of the memory cells,
   wherein the first metal line and the second metal line together carry a bit line signal through the bit line.

8. The memory device of claim 7, wherein the memory device includes a first metal level, a second metal level over the first metal level, a third metal level over the second metal level, and a fourth metal level over the third metal level,
   the source line is disposed on the fourth metal level, and the memory elements are disposed between the third metal level and the fourth metal level.

9. The memory device of claim 8, wherein the plurality of word lines and the second electrodes of the memory cells are on the third metal level.

10. The memory device of claim 9, wherein, when the plurality of word lines and the second electrodes of memory cells are alternately arranged in parallel in the first direction.

11. The memory device of claim 7, wherein the second metal line has higher conductivity than the first metal line.

12. The memory device of claim 7, wherein the memory element includes a resistive material layer between the first electrode and the second electrode.

13. The memory device of claim 7, wherein the first electrode has a plate shape and the second electrode has an island shape, when viewed in a plan view.

14. A method of forming a memory cell array structure, the method comprising:
    forming a memory cell including a memory element and a transistor having a source terminal coupled to a second electrode of the memory element;
    forming a bit line coupled to a drain terminal of the transistor, the bit line being formed of a first metal line and a second metal line extending in a first direction, the second metal line coupled to the first metal line and formed over the first metal line in a third direction;
    forming a word line coupled to a gate terminal of the transistor, the word line being formed of a third metal line that extends in a second direction crossing the first direction and is formed over the second metal line in the third direction, the first and the second directions being perpendicular to the third direction; and
    forming a source line coupled to a first electrode of the memory element,
    wherein the first metal line and the second metal line together carry a bit line signal through the bit line.

15. The method of claim 14, wherein the memory cell array structure includes a first metal level, a second metal level over the first metal level, a third metal level over the second metal level, and a fourth metal level over the third metal level,
    the source line is formed on the fourth metal level, and the memory element is disposed between the third metal level and the fourth metal level.

16. The method of claim 15, wherein the word line and the second electrode are on the third metal level.

17. The method of claim 14, wherein the second metal line has higher conductivity than the first metal line.

18. The method of claim 14, wherein the memory element includes a resistive material layer between the first electrode and the second electrode.

19. The method of claim 14, wherein the first electrode has a plate shape and the second electrode has an island shape, when viewed in a plan view.

* * * * *